(12) United States Patent
Zernickel et al.

(10) Patent No.: US 8,766,150 B2
(45) Date of Patent: Jul. 1, 2014

(54) DEVICE FOR HARDENING THE TEETH OF GEAR WHEELS BY INDIVIDUAL INDUCTIVE HEAT TREATMENT FOR EACH TOOTH, USING SEVERAL INDUCTORS

(75) Inventors: Reinhard Zernickel, Waldkirch (DE); Josef Wagner, Riegel (DE)

(73) Assignee: EFD Induction GmbH, Freiburg (DE)

( * ) Notice: Subject to any disclaimer, the term of this patent is extended or adjusted under 35 U.S.C. 154(b) by 533 days.

(21) Appl. No.: 13/058,632

(22) PCT Filed: Aug. 10, 2009

(86) PCT No.: PCT/DE2009/001128
§ 371 (c)(1),
(2), (4) Date: Feb. 11, 2011

(87) PCT Pub. No.: WO2010/017810
PCT Pub. Date: Feb. 18, 2010

(65) Prior Publication Data
US 2011/0147373 A1    Jun. 23, 2011

(30) Foreign Application Priority Data

Aug. 13, 2008    (DE) .......................... 10 2008 038 967

(51) Int. Cl.
*H05B 6/10*    (2006.01)

(52) U.S. Cl.
USPC .......................................... 219/640

(58) Field of Classification Search
CPC ............. C21D 1/10; C21D 9/32; H05B 6/405
USPC ................... 219/640–662; 148/147
See application file for complete search history.

(56) References Cited

U.S. PATENT DOCUMENTS

| | | | | |
|---|---|---|---|---|
| 2,277,082 A | * | 3/1942 | Denneen et al. | 266/126 |
| 2,857,154 A | * | 10/1958 | Jones | 266/125 |
| 3,446,495 A | * | 5/1969 | Pfaffman et al. | 266/125 |
| 4,123,642 A | | 10/1978 | Dammel | |
| 4,894,501 A | * | 1/1990 | Pfaffmann et al. | 219/640 |
| 5,310,432 A | | 5/1994 | Fukui | |

FOREIGN PATENT DOCUMENTS

| | | |
|---|---|---|
| GB | 595 672 | 12/1947 |
| GB | 788 752 | 1/1958 |
| JP | 2000282145 A * | 10/2000 |

* cited by examiner

*Primary Examiner* — Dana Ross
*Assistant Examiner* — Renee L Miller
(74) *Attorney, Agent, or Firm* — Gudrun E. Huckett

(57) ABSTRACT

A device for hardening the teeth (2) of gear wheels by inductive heat treatment provides for at least two hardness inductors (3), which are distributed over the circumference.

9 Claims, 6 Drawing Sheets

DEVICE FOR HARDENING THE TEETH OF GEAR WHEELS BY INDIVIDUAL INDUCTIVE HEAT TREATMENT FOR EACH TOOTH, USING SEVERAL INDUCTORS

BACKGROUND OF THE INVENTION

The invention concerns a device for hardening the teeth of gear wheels by inductive heat treatment, the device comprising a rotary device for rotating the gear wheel about its central axis as well as comprising a radially movable hardening inductor for hardening the tooth bodies and/or tooth sass as well as subsequent quenching.

The device, in this connection, is suitable for gearwheels with an external toothing as well as with an internal toothing.

Depending on the application purpose of gear wheels, the individual teeth must be hardened. In case of large gear wheels, this is carried out in general by individual tooth hardening. In this connection, one must differentiate between hardening of the tooth tip, i.e., the tooth body, or—depending on the application purpose—the hardening of the tooth gaps.

Hardening of these large gear wheels increasingly is performed by means of induction heating devices. For this purpose, the gear wheels are clamped on a rotary device (in general, an NC axis).

Hardening is carried out by means of an inductor by heating a precisely defined zone of the tooth body with a defined heating depth to a precisely defined annealing temperature (hardening temperature). The immediately following quenching process by means of a suitable quenching medium (for example, water, possibly with certain admixed additives) hardens the teeth to a predetermined degree of hardness.

Performing this gear wheel hardening has been carried out up to now on machines with a single inductor. The hardening process is correlated with a significant time expenditure that—depending on the size of the gear wheel—may extend into the range of hours. In this connection, either directly adjacent tooth tips/tooth gaps are processed in a single revolution. Processing can however also be done with a defined spacing of the tooth tips/tooth gaps, i.e., every second, every third, every fourth tooth tip/tooth gap is hardened. In this way, the thermal influence of the neighboring teeth by the prior hardening process is reduced. In this method, the gear wheel must therefore be rotated completely several times.

Based on this, it is the object of the invention to provide a device for hardening the teeth on gear wheels by inductive heat treatment with which method the gear wheels can be hardened faster.

SUMMARY OF THE INVENTION

The technical solution is characterized by the following features: at least two hardening inductors are provided which are arranged about the circumference of the gear wheel in accordance with an integral multiple of the sector angle of two neighboring teeth, and which, after a certain rotation of the gearwheel, are simultaneously actuated for hardening the teeth positioned in the effective area of the hardening inductors.

The principle according to the invention resides in gear wheel hardening by using several inductors that operate simultaneously. Decisive in this connection is an optimized sequence of the timing of employment of the hardening inductors. The method can be used in principle for straight toothings as well as for helical toothings (with left or right pitch) and, moreover, also for external toothings as well as for internal toothings. With the targeted and temporally matched use of several hardening inductors, the possibility is provided overall to harden the gear wheel much faster. Prerequisite for this is a predetermined optimized algorithm for the successively occurring processing steps with an appropriate advancement of the gear wheel.

Preferably, the hardening inductors are substantially arranged uniformly about the circumference of the gear wheel. In this way, the mutual disturbance of the hardening inductors is minimized. When, for example, two hardening inductors are employed, they are substantially spaced apart at an angle of 180°. In case of three hardening inductors, the individual inductors are spaced apart at approximately 120°.

In a first variant of the method sequence the segment-wise processing of the gear wheel is proposed. This means that several hardening inductors are distributed about the circumference of the gear wheel and they divide the processing action segment-wise among each other. In this connection, the directly neighboring tooth bodies/tooth gaps are processed simultaneously by the hardening inductors within a single revolution of the gear wheel.

An alternative to this is proposed, wherein several hardening inductors are distributed about the circumference of the gearwheel. Processing is realized however at a defined spacing, i.e., every second, third, fourth etc. tooth body/tooth gap is hardened. This is realized synchronously through all hardening inductors that are available. In this way, the thermal influence of the neighboring teeth of the respective inductor segment by the prior hardening process is reduced. This means also that the gear wheel is processed in several revolutions.

According to another embodiment, the hardening inductors after hardening and quenching are used additionally as annealing inductors. Accordingly, the tooth bodies/tooth gaps are first heated by the available inductors (wherein the inductors are used in this connection as hardening inductors) and subsequently are immediately quenched. After this hardening process the tooth bodies/tooth gaps are annealed by the same inductors at reduced output. In this case, the inductors function as annealing inductors. "Annealing" is to be understood in this context such that the tooth bodies/tooth gaps are heated with reduced energy output so that a significantly reduced heating temperature is adjusted. Quenching is not provided in this context. Annealing serves for reducing stress within the metal. By using the hardening inductors as annealing inductors, a significantly faster processing of the gear wheel results. Annealing can be realized in several ways. For example, the teeth can be annealed at reduced energy output with the same program sequence as during hardening. In this connection (as described above), either a segment-wise processing or processing by skipping the teeth can be realized. However, it is also conceivable that in the method where there is no segment-wise operation but instead teeth are skipped, the gear wheel, after each revolution, i.e., after completed hardening, is annealed in the subsequent revolution by the same inductors. Subsequently, in the subsequent revolution hardening is performed again, subsequently annealing etc. As a whole, the program sequence for annealing is identical to that of hardening. Therefore, there is a 1st cycle hardening/1st cycle annealing/2nd cycle hardening/2nd cycle annealing etc.

An alternative to this provides additional annealing inductors. They also operate at reduced energy output and thus with a significantly reduced heating temperature without quenching. Here also, processing is performed segment-wise or by skipping teeth. In this version, the teeth are hardened by the first half of the inductors while during the course of the same revolution of the gear wheel by the second half of the inductors the teeth are annealed. Annealing is however realized after a defined advancement of the hardening inductors. In this connection, it is adjusted for how many teeth (at least 1 tooth) after the start of the hardening process the annealing process is to be started. The occasionally complex movement sequences of the hardening inductors and of the annealing inductors relative to one another are calculated by a suitable arithmetic. The start of the annealing inductors may be delayed by more than 1 tooth also because, based on the physical effects (hardening and immediately thereafter annealing), it is mandatory to allow for a certain resting time for the instantly hardened teeth (so-called resting teeth) before the annealing process is performed. Accordingly, the delay may also be caused in that, before annealing, the instantly hardened teeth are exposed to a defined post quenching time. Upon hardening and annealing for two or a multiple of two inductors, the tooth bodies/tooth gaps can be heated by one or several inductors and thereafter can be quenched immediately. An annealing inductor that follows in the same tooth (arranged atop each other) then heats the hardening zone to annealing temperature. Two or several inductors are thus distributed about the circumference of the gear wheel. The first hardening inductor that is arranged above the respective second annealing inductor heats the tooth to hardening temperature. By immediate quenching of the heating zone, the latter is hardened. The second annealing inductor following in the same tooth heats the hardening zone to annealing temperature. The advantage resides here in that the non-productive time becomes shorter.

A further embodiment proposes that the hardening inductors and/or the annealing inductors are adjustable, viewed in circumferential direction. In this way, the device is useable for very different gear wheels with different number of teeth. The orientation of the inductors is calculated by a program so that the inductors can be positioned accordingly. Also, the adjustment of the inductors in the circumferential direction has the advantage that possible distortion effects in the gear wheel can be compensated.

As has already been mentioned above, different cycles for hardening the teeth of the gear wheel are provided according to one embodiment.

Finally, another embodiment proposes that the teeth are preheated. The tooth bodies/tooth gaps are thus preheated by two, or a multiple of two, inductors and immediately hardened by the respective second following inductor (arranged atop each other). By preheating, it is achieved, for example, that the hardened material is less prone to fracture.

BRIEF DESCRIPTION OF THE DRAWINGS

Two embodiments of the device according to the invention for hardening the teeth of gear wheels by inductive heat treatment will be described in the following with the aid of the drawings. It is shown in.

DESCRIPTION OF PREFERRED EMBODIMENTS

Figure 1:
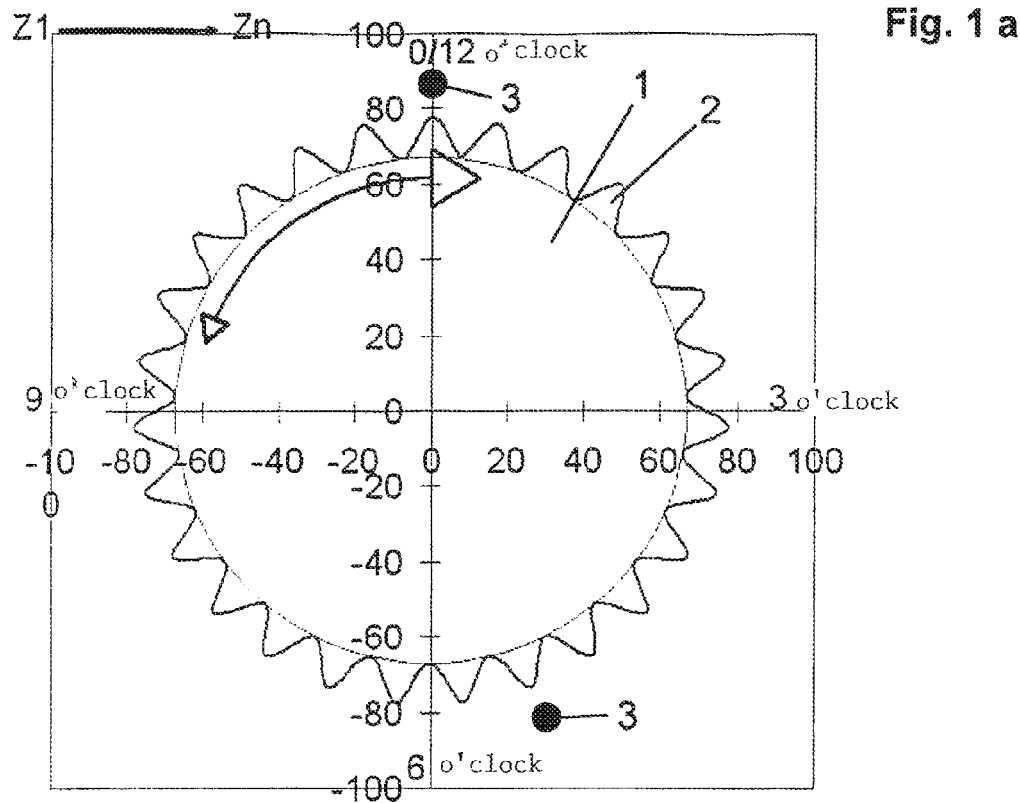
FIGS. 1a to 1f the first embodiment with two hardening inductors for tooth tips.
Figure 1:
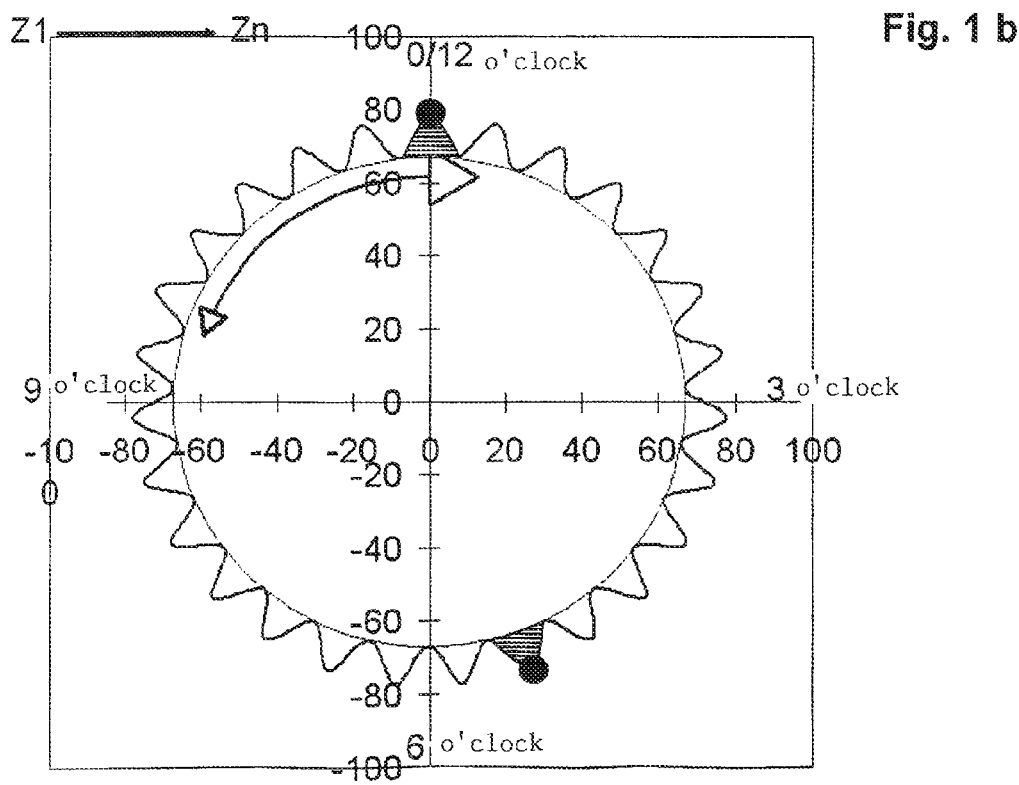
Figure 1:
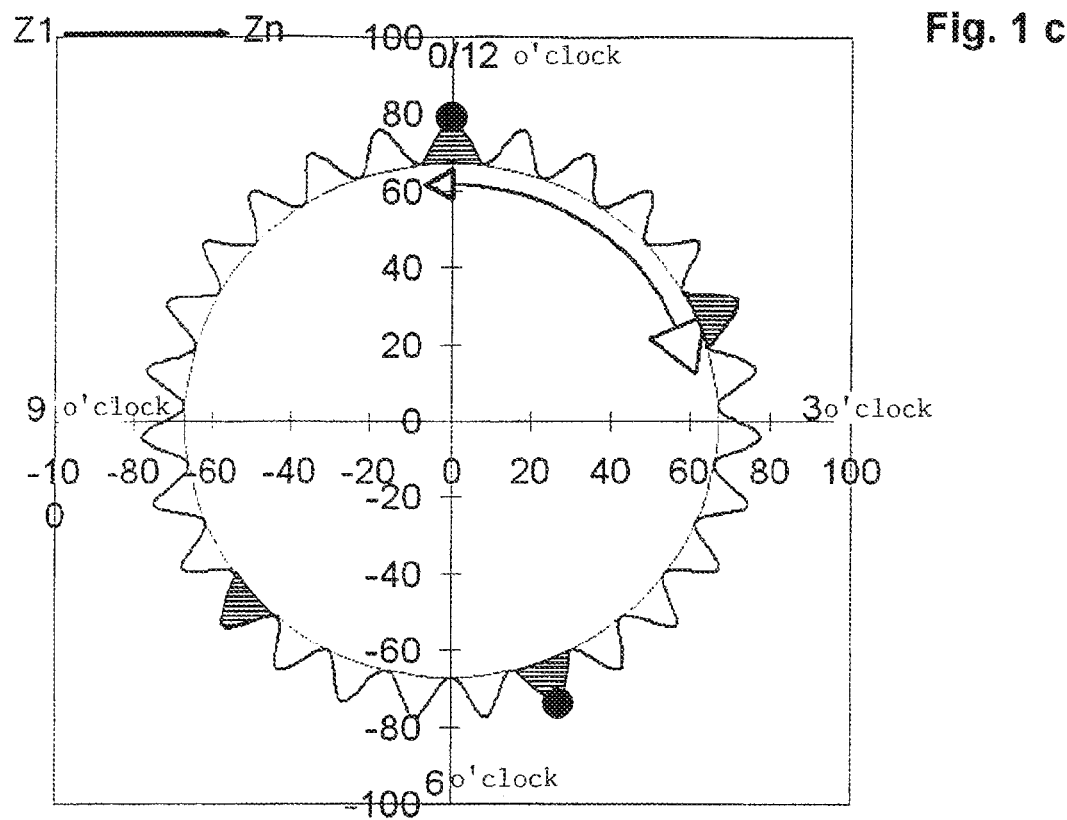
Figure 1:
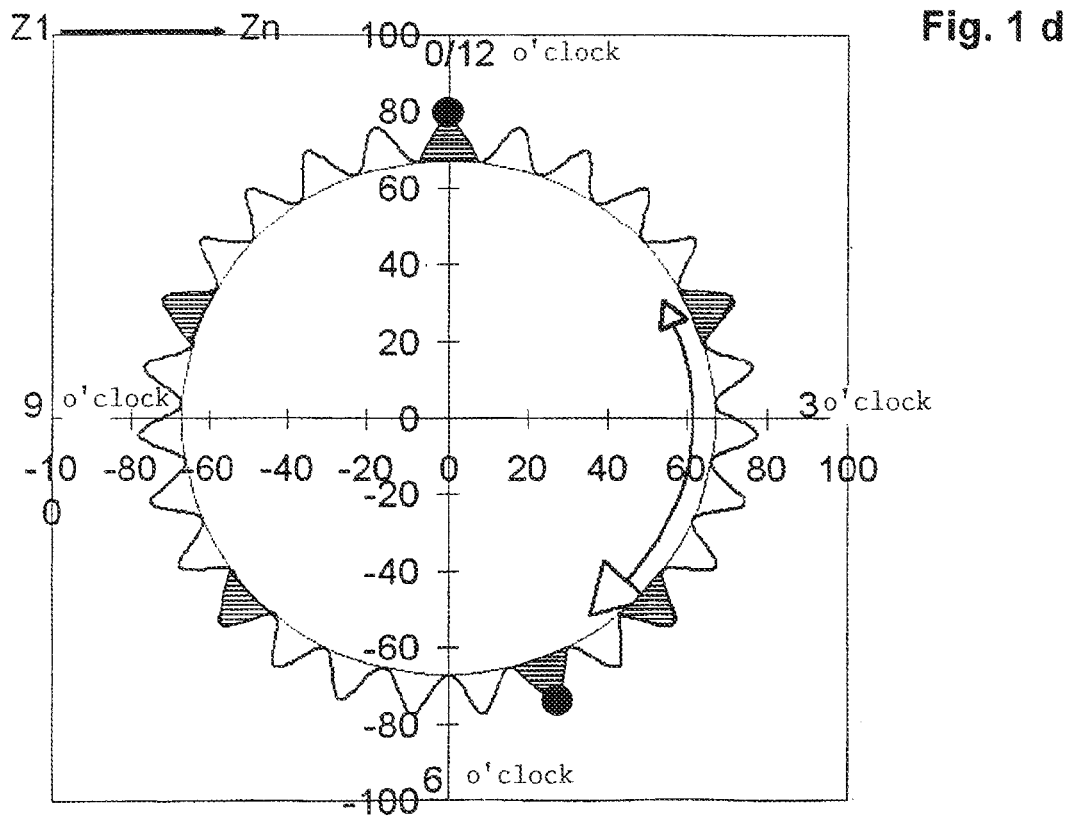
Figure 1:
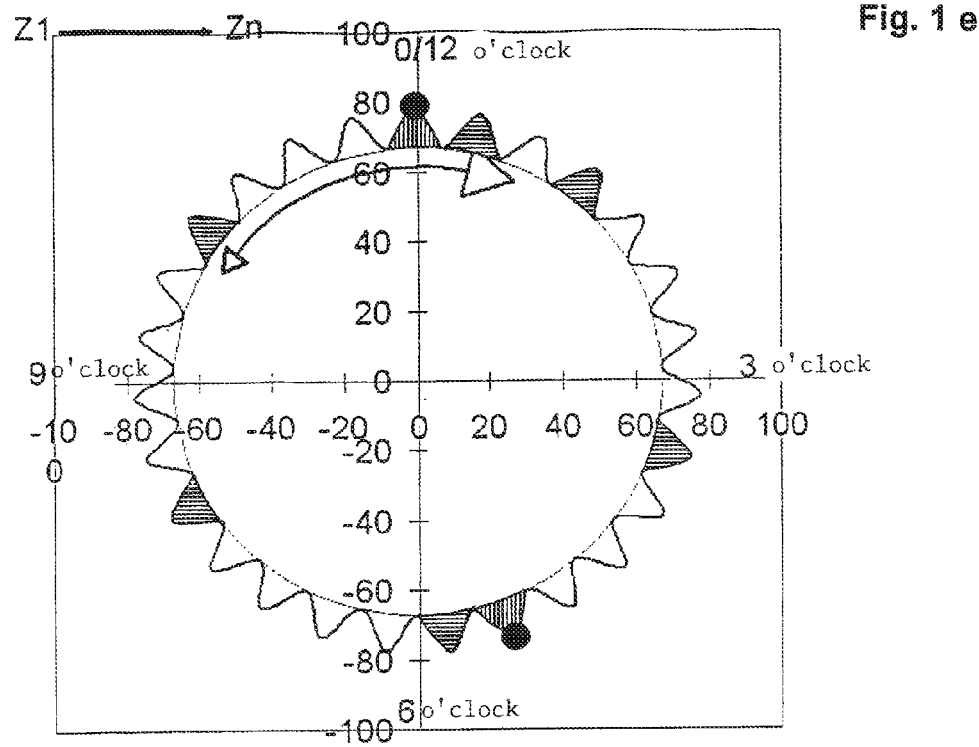
Figure 1:
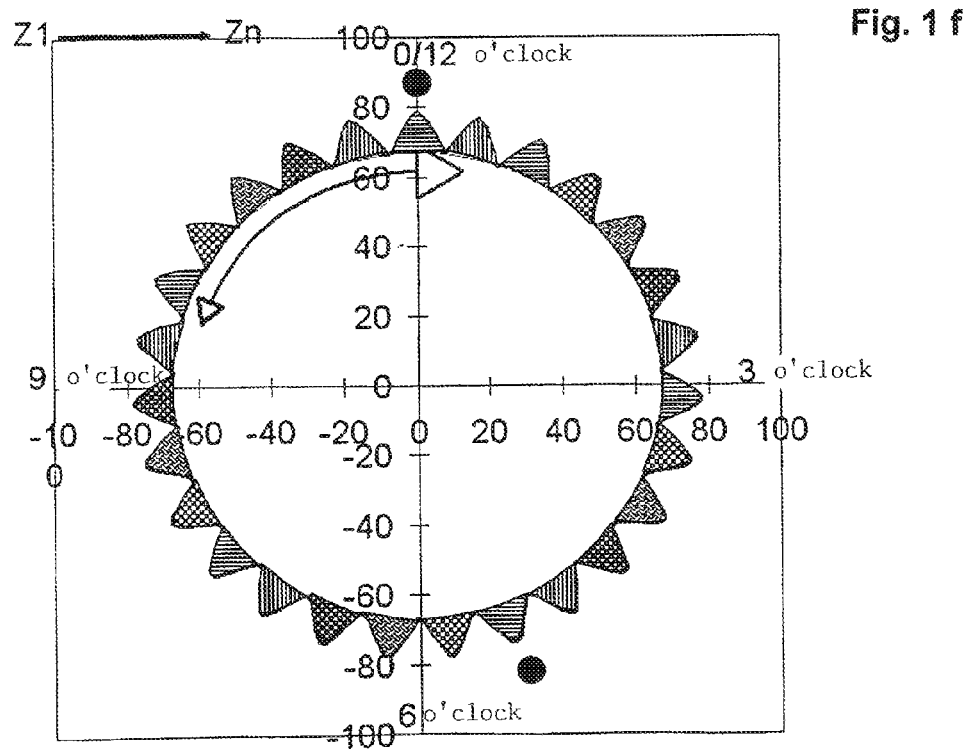

In the first embodiment variant, in FIG. 1a the initial position is shown. A gear wheel 1 with 27 teeth 2 to be hardened is rotatably supported. Moreover, two hardening inductors 3 are provided. The two hardening inductors 3 are located approximately at 12 o'clock position and at 5 o'clock position. The orientation of the two hardening inductors 3 is calculated by a program.

In FIG. 1b it is shown how the two hardening inductors 3 are in use and harden the tooth body no. 1 and the tooth body no. 16. This is indicated in the drawing by the horizontal cross-hatching.

In FIG. 1c it is illustrated that the gearwheel 1 has been rotated farther by five teeth 2. This means that now the tooth no. 6 and the tooth no. 21 are in the area of the two hardening inductors 3. As a result of the large distance of the two hardening inductors 3 relative to each other a mutual influence is prevented.

FIG. 1d shows a further step of the first cycle. After this advancing step of the gear wheel 1 to this position the hardening inductors 3 are again in action. Thus, the first cycle is completed.

In FIG. 1e the second cycle begins. This is indicated by a different cross-hatching.

Successive steps and successive cycles continue on and on until all 27 teeth 2 of the gear wheel 1 are completely hardened. This final state is illustrated in FIG. 1f.

The embodiment variant in FIGS. 2a to 2f differs from the first embodiment variant of FIGS. 1a to 1f in that in addition to the two hardening inductors 3 there are two annealing inductors 4 provided.

Figure 2:
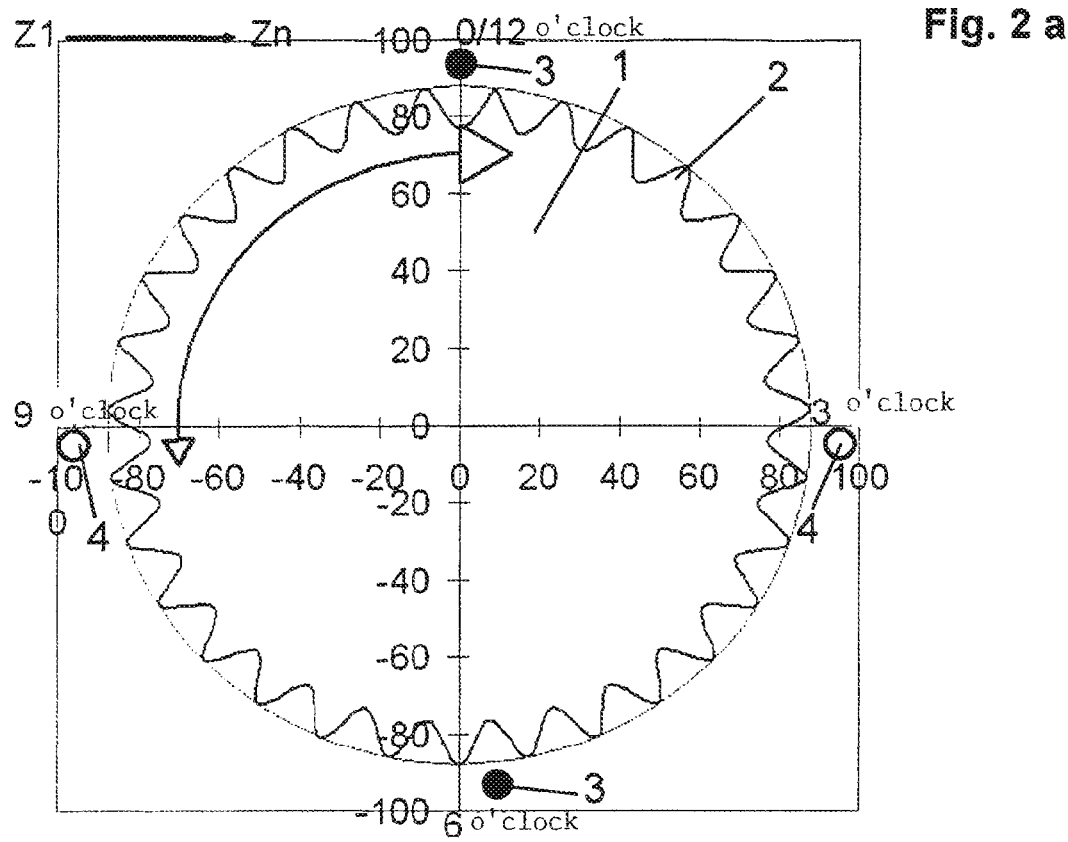
FIGS. 2a to 2f the second embodiment with two hardening inductors as well as two annealing inductors for tooth gaps.
Figure 2:
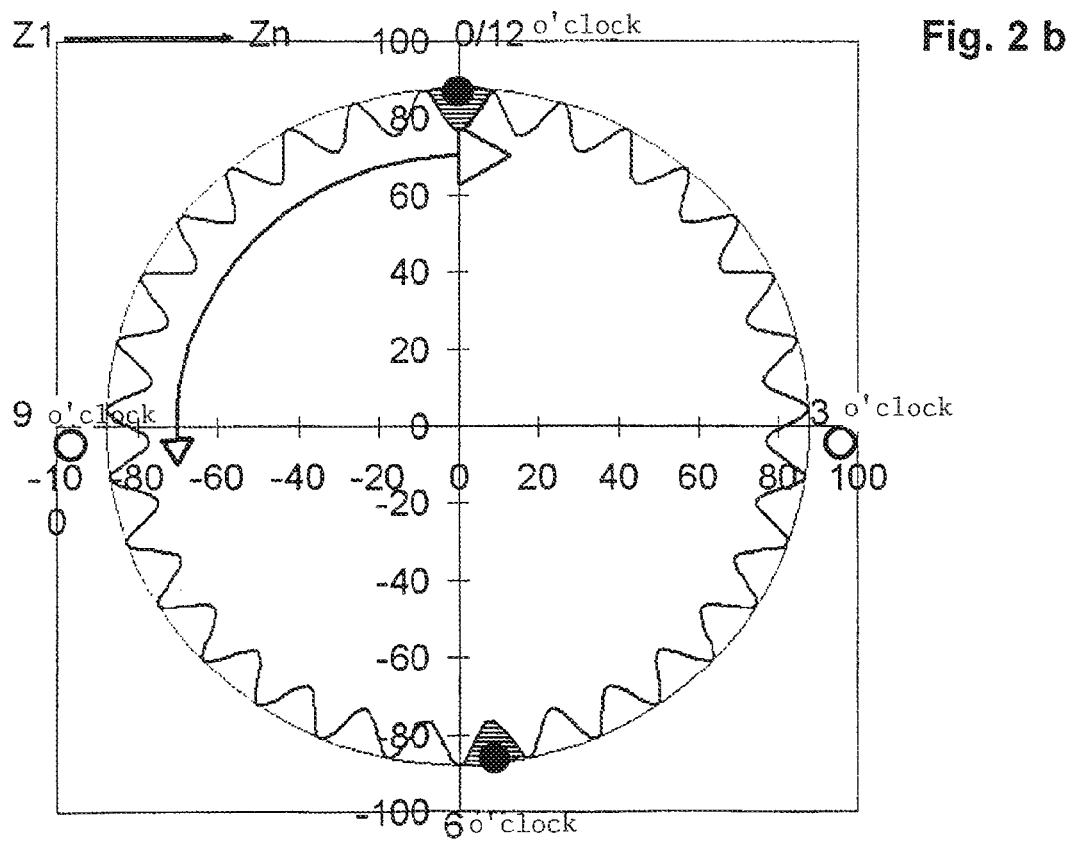
Figure 2:
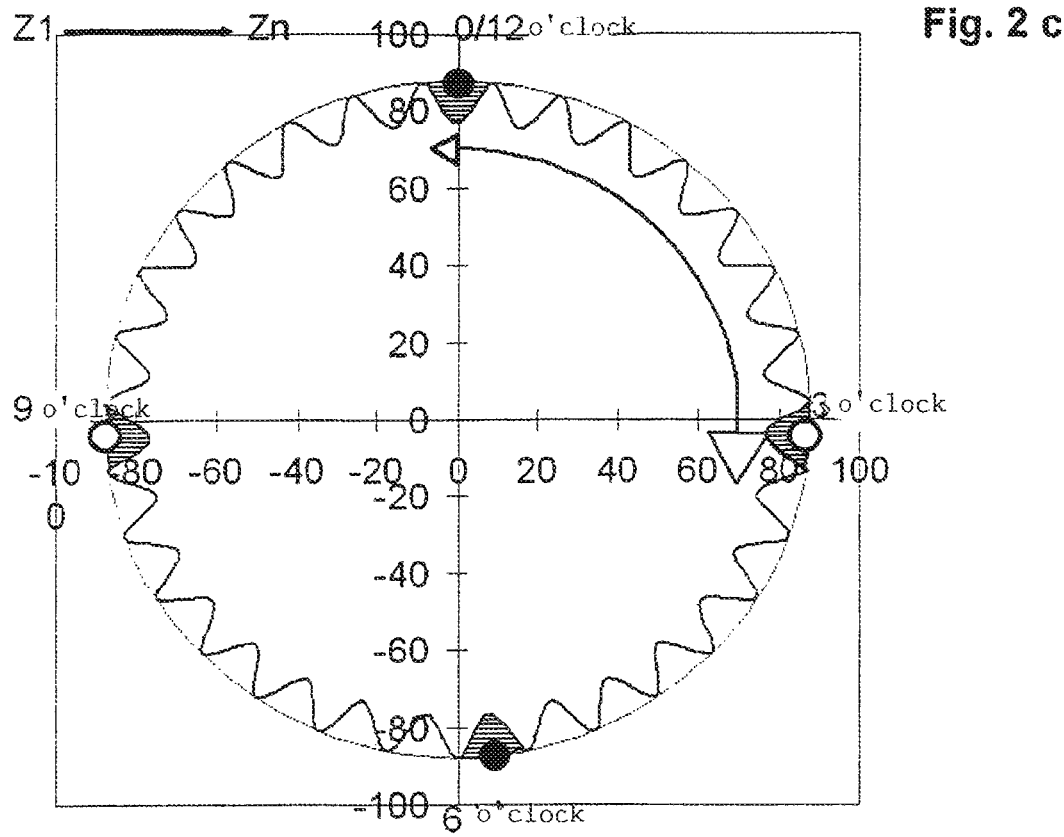
Figure 2:
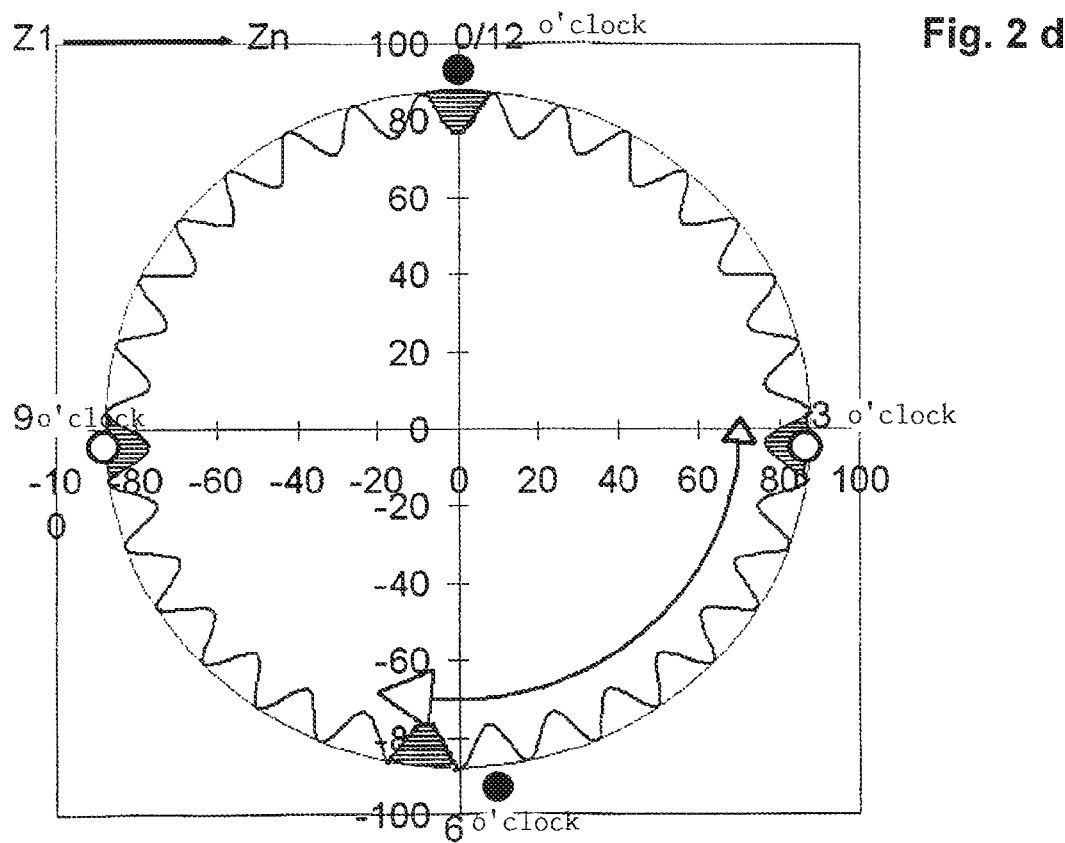
Figure 2:
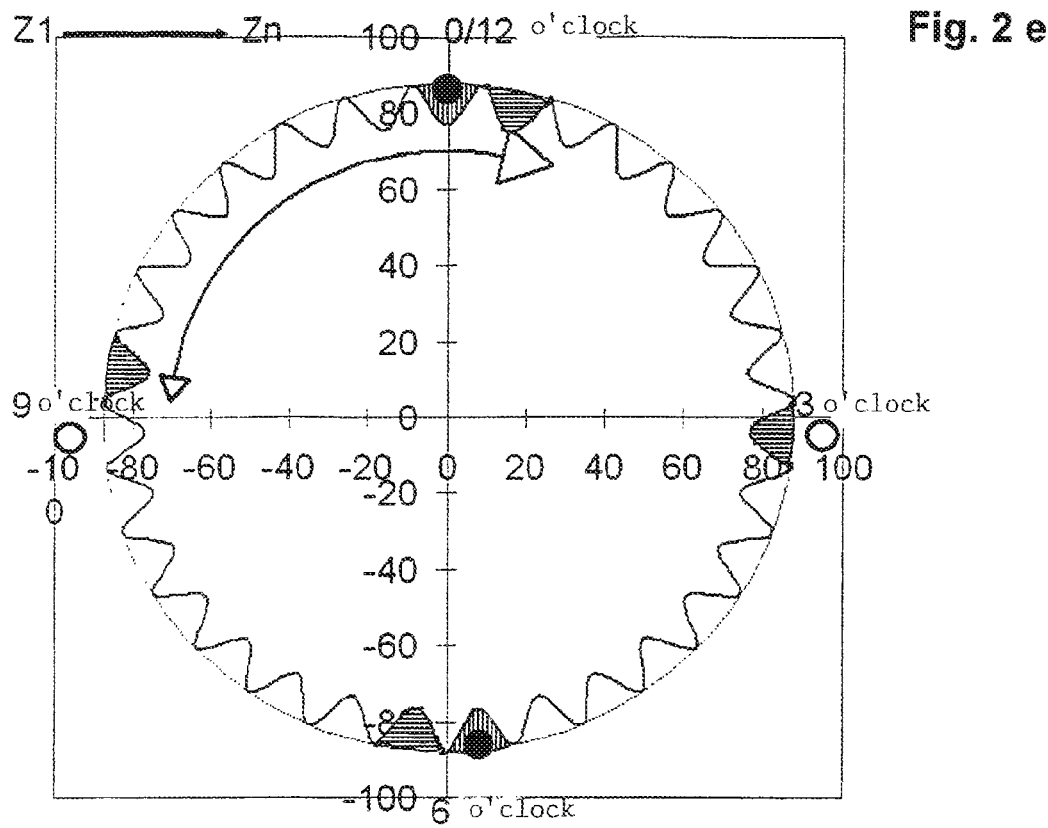
Figure 2:
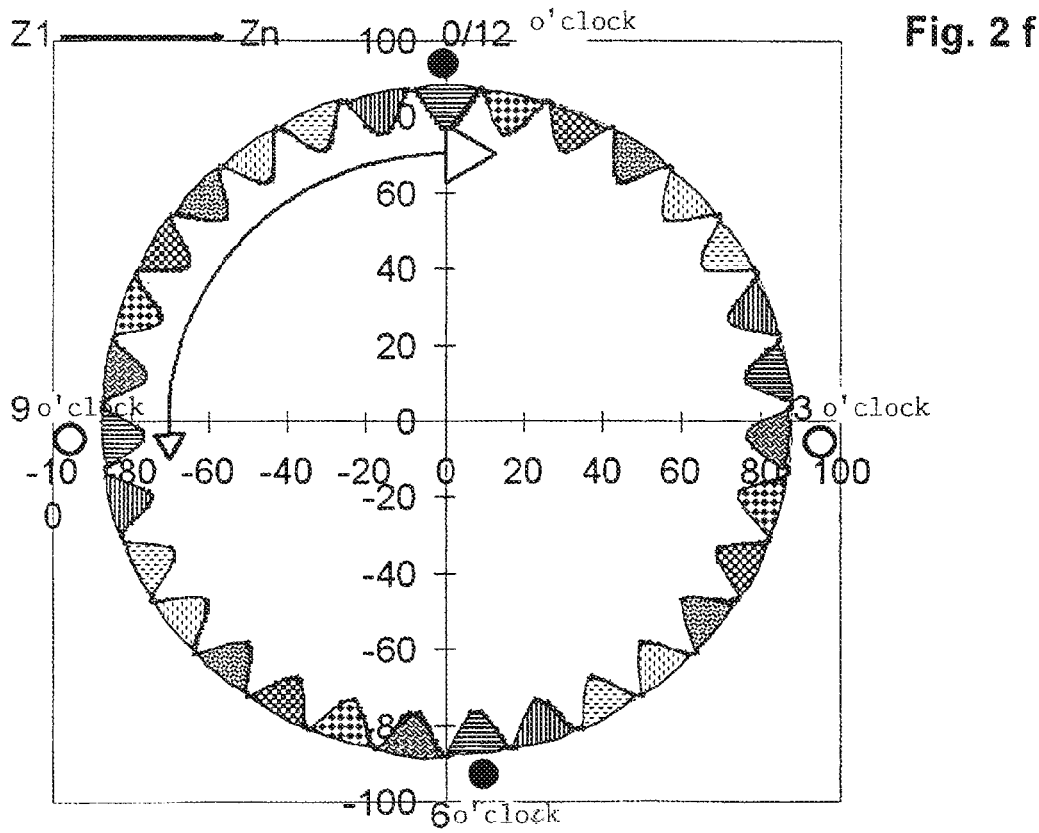

In this connection, in FIG. 2a the initial position with a gear wheel 1 of 31 teeth 2 is illustrated. In this connection, the two hardening inductors 3 are approximately at 12 o'clock as well as 6 o'clock position and the two annealing inductors 4 are approximately at 3 o'clock position and at 9 o'clock position. Here, the orientation of the inductors 3, 4 is also calculated by a program.

In FIG. 2b the two hardening inductors 3 are in use and harden the tooth gaps and not the tooth bodies, in contrast to the first embodiment. The annealing inductors 4 at this point in time are not yet in use because no hardened tooth gaps are existing yet.

FIG. 2c shows the second step after further rotation of the gear wheel 1. The two hardening inductors 3 harden the tooth gaps no. 9 and no. 25. Because of the large spacing of the two hardening inductors 3 a mutual influence is prevented. Temporally parallel to this hardening, the two annealing inductors 4 heat the previously hardened tooth gaps no. 1 and no. 17 to annealing temperature.

After an advancing step in FIG. 2d in this position of the gear wheel 1 the hardening inductors 3 are not in operation. The annealing inductors 4, on the other hand, heat the tooth gaps no. 9 and no. 25. Both have been hardened prior to this in the preceding working step by the hardening inductors 3.

In FIG. 2e the second cycle, overall step 4, is illustrated. In this step, only the hardening inductors 3 are in use. They harden the tooth gap no. 2 as well as no. 18. The two annealing inductors 4 are not in operation.

The action is continued successively until according to FIG. 2f the final state is reached. Illustrated is the situation of gear wheel 1 with hardened and annealed teeth 2.

The first embodiment variant can be used in principle also for tooth gaps while the second embodiment is in principle also suitable for tooth tips. Moreover, the two embodiment variants are also usable for inner toothings.

LIST OF REFERENCE NUMERALS 1 gear wheel
2 teeth
3 hardening inductors
4 annealing inductors

What is claimed is:

1. A device for hardening teeth of a gear wheel by inductive heat treatment followed by a quenching action, the device comprising:
   a rotary device for rotating a gear wheel about a central axis of the gear wheel;
   at least two radially movable hardening inductors, wherein the at least two hardening inductors are arranged about a circumference of the gear wheel at a spacing relative to each other, the spacing selected in accordance with an integral multiple of a sector angle of two neighboring teeth of the gear wheel;
   wherein the at least two hardening inductors, after a certain rotation of the gear wheel, are simultaneously actuated for hardening those teeth of the gear wheel that are positioned in an effective area of the at least two hardening inductors, wherein tooth bodies and/or tooth gaps of the teeth of the gear wheel are hardened;
   annealing inductors, wherein for each one of the at least two hardening inductors one of the annealing inductors is provided, wherein the annealing inductors are arranged such about the circumference of the gear wheel that areas of the gear wheel hardened previously by the at least two hardening inductors upon rotation of the gear wheel are moved immediately, or after leaving out one or several steps, into the effective area of the annealing inductors.

2. The device according to claim 1, wherein the at least two hardening inductors and the annealing inductors are position-adjustable in the circumferential direction of the gear wheel.

3. The device according to claim 1, wherein the at least two hardening inductors are arranged substantially uniformly about the circumference of the gear wheel.

4. The device according to claim 1, wherein the at least two hardening inductors divide processing of the gear wheel segment-wise among themselves in that the at least two hardening inductors harden neighboring teeth of the gear wheel tooth by tooth.

5. The device according to claim 1, wherein upon successive forward rotation of the gear wheel teeth are skipped.

6. The device according to claim 1, wherein, for hardening all teeth of the gear wheel, several sequential cycles, each having a determined processing sequence, are carried out.

7. The device according to claim 1, wherein the teeth of the gear wheel are preheated.

8. The device according to claim 1, wherein the at least two hardening inductors are position-adjustable in the circumferential direction of the gear wheel.

9. The device according to claim 1, wherein the annealing inductors are position-adjustable in the circumferential direction of the gear wheel.

* * * * *